United States Patent
Schumacher et al.

(10) Patent No.: US 6,698,175 B1
(45) Date of Patent: Mar. 2, 2004

(54) ADJUSTMENT ARRANGEMENT FOR THE TINE CARRIER OF A REEL FOR A CUTTING DEVICE

(75) Inventors: Gustav Schumacher, Eichelhardt (DE); Fredrich-Wilhelm Schumacher, Eichelhardt (DE); Klaus-Dieter Schumacher, Helmeroth (DE)

(73) Assignee: Gebr. Schumacher Geratebaugesellschaft mbH (DE)

( * ) Notice: Subject to any disclaimer, the term of this patent is extended or adjusted under 35 U.S.C. 154(b) by 0 days.

(21) Appl. No.: 10/049,563

(22) PCT Filed: Jul. 14, 2000

(86) PCT No.: PCT/DE00/02325
§ 371 (c)(1),
(2), (4) Date: Jun. 20, 2002

(87) PCT Pub. No.: WO01/11940
PCT Pub. Date: Feb. 22, 2001

(30) Foreign Application Priority Data

Aug. 18, 1999 (DE) .......................... 199 38 585
Jun. 20, 2000 (DE) .......................... 100 29 372

(51) Int. Cl.$^7$ .............................................. A01D 57/02
(52) U.S. Cl. .............................. 56/220; 56/14.4; 56/224
(58) Field of Search ......................... 56/220, 16.1, 219, 56/126, 12.4, 12.5, 14.3, 14.4, 221, 222, 223, 224, 225, 226, 227

(56) References Cited

U.S. PATENT DOCUMENTS

| | | | |
|---|---|---|---|
| 2,380,173 A | * 7/1945 | Harrison | 56/226 |
| 2,694,894 A | 11/1954 | Linscheid | 56/226 |
| 3,302,378 A | * 2/1967 | Rasmussen | 56/328.1 |
| 3,472,008 A | * 10/1969 | Hurlburt | 56/226 |
| 3,940,910 A | * 3/1976 | d'Acremont | 56/14.4 |
| 4,067,177 A | * 1/1978 | Tout | 56/226 |
| 5,007,235 A | 4/1991 | Nickel et al. | 56/12.4 |
| 5,359,839 A | 11/1994 | Parsons et al. | 56/130 |
| 5,595,053 A | * 1/1997 | Jasper et al. | 56/226 |
| 5,768,870 A | 6/1998 | Remillard et al. | 56/364 |
| 5,987,861 A | * 11/1999 | Duncan et al. | 56/14.4 |
| 6,170,244 B1 | * 1/2001 | Coers et al. | 56/226 |
| 6,453,655 B2 | * 9/2002 | Ferraris | 56/220 |

FOREIGN PATENT DOCUMENTS

FR          2 247 153          5/1975

* cited by examiner

*Primary Examiner*—Árpád Fábián Kovács
(74) *Attorney, Agent, or Firm*—Harness, Dickey & Pierce, P.L.C.

(57) ABSTRACT

The invention relates to an adjustment arrangement for a reel tine carrier (5) supporting reaping tines (8) for a cereal cutting device. The reaping tines (8) are mounted on rotational tine carriers (5). The adjustment is carried out around an adjustment axis (9). The reel rotates around an axis of rotation (2). To adjust the reaping tines (8), a first control curve (19) is kept stationary relative to the reel (1). Each tine carrier (5) is provided with a control lever (16). The control lever is pivotably supported on the reel (1). One end of the control lever is supported on the first control curve (19). A pulling mechanism (11) is provided for each control lever (16). The pulling mechanism (11) is attached to one end on the control lever (16) and is guided around a control disc (10) mounted on the tine carrier (5). The other end of the pulling mechanism is fixed to a spring element (14). The spring element is fixed on the holding star 4 of the reel. As the reel (1) is rotated, a pivoting adjustment of the reaping tines (8) is carried out.

14 Claims, 7 Drawing Sheets

ADJUSTMENT ARRANGEMENT FOR THE TINE CARRIER OF A REEL FOR A CUTTING DEVICE

CROSS-REFERENCE TO RELATED APPLICATIONS

This application claims priority to German Patent Application No. 19938585.8 filed Aug. 18, 1999, which application is herein expressly incorporated by reference.

1. Field of the Invention

The invention relates to an adjustment arrangement for a tine carriers of a reel for a cereal cutting device which carries reaping tines.

2. Background of the Invention

In practical work, two basic types of reels are used on combine-harvesters. One type is a simple paddle reel which only transports the harvesting goods by tineless paddle bars to the machine. A second type is a tine reel. Here additional paddle tubes or paddle bars steel tines or plastic tines are mounted on the machine.

The tine reel has succeeded in combine-harvesters compared to the simple paddle reel since the tine reel can also securely process whirled harvesting goods. In a simple paddle reel, the paddle bars are rigidly mounted on the radial carrier stars. The stars are mounted on the center axle. The center axle is rotatably supported on the side bars above the cutting bar or reception bar of a harvesting machine. The bars in a tine reel, which include tines or tubes, are rotatably supported as tine carriers on the radial carrier stars.

Accordingly, the tines always work in a generally vertical direction to the ground. Thus, in most cases, a control star is used. The control star is arranged radially eccentrically to the axis and therefore also eccentrically to the carrier stars. The control star has a circular control path in the center in which one or more guide rollers roll. The guide rollers are supported by corresponding connection means on the side bars. The tine carriers are provided on the end with small cranks. The crankpins are respectively rotatably supported on the control star. The control star rotates in the same direction and with the same rotational speed as the holding star. Since the control star rotates eccentrically with reference to the holding stars, the crank ends of the tine carrier bars or the tine carrier tubes also rotate once with each reel rotation. Thus, the tines always show in the same direction, which in most cases are directed straight downwards.

Such reel controls have been known for a long time and are still used today in many reels of harvesting machines. Such reels have, however, the decisive disadvantage, that stems wrap around the tine carriers since the reels always rotate in the same direction. This leads, in some harvesting goods, to the tine carriers being completely wound full within a few harvesting meters. Thus, not only is the function hindered, but the total reel is blocked. It is very difficult and very often, very time consuming to loosen the rigidly wound stems manually from the tine carriers.

To avoid this unwanted condition, reels like those illustrated in DE-OS 27 36, 104, were developed. Here the tine carriers only pivot with each reel rotation around roughly 170° in one direction and then pivot back again by the same degree. To achieve this 170° rotation, a complicated lever mechanism is installed. Thus, the tines can not be inexpensively attached to a tine carrier but have to be attached by a more expensive paddle profile. The largest disadvantage is, however, that because of the forward and backward pivoting, the reel tines seen in forward driving direction project forward into a specific area and, when dipping into, for example, standing stems, a hitting movement is carried out. In sensitive harvesting goods, for example rape, the pods are beaten open, before they are transported to the machine.

A further disadvantage is that the tines project into the roadway when the very wide cutting device is stored on a transport wagon in a longitudinal direction and transported in road traffic from one place of usage to the next place of usage. The tine carrier which projects to the front must be detached from its control bars. The tine carrier tubes may be pivoted by hand. Thus, the tines do not project into the roadway. If this is not possible, the tines must be covered with an extensive protection device for such a transport.

To avoid a complicated lever mechanism in the prementioned construction and to be able to use cheaper tubes instead of the expensive profiles as tine carriers, a reel design according to U.S. Pat. No. 5,007,235 or DE-AS 17 57 228 installs curve paths on the reel front sides on the holding bar. Here, rollers, mounted on levers and connected to the tine carrier tubes run on the curve paths. Depending on the path of the radii of the curves the rollers rotate the tine carrier via the lever. However, even here it is difficult, to use a curve, which ensures the pivoting of the tine carrier around more than 170°. Even in these known constructions, the tines always project in a specific rotational area in a driving direction toward the front. Thus, they likewise include the previously described disadvantages.

U.S. Pat. No. 5,007,235 describes an embodiment of a reel which includes the above disadvantages. On each pivotable tine carrier, a short lever is mounted. The lever is displaced via a control roller by a control curve, which has a form diverting from a circular form. The curve extends closely to the tine carrier and at least over a partial area outside the circle of rotation of the tine carrier.

U.S. Pat. No. 2,694,894 shows an adjustment arrangement. Here pivoting levers are connected to a reel pivotably around an axis. The pivoting lever has reaping tines on one end and rollers on the other end. The rollers run on a control curve, which diverts from a circular path. Therefore, depending on the distance of the control curve to an axis of rotation of the reel, the pivoting lever and the reaping tines are pivoted. To achieve large pivoting angles, the control curve has to have, however, at least partially, a large distance to the axis of rotation of the reel. Partially the distance of the control curve to the axis of rotation of the reel is larger than the radius of rotation of the reel and is therefore large.

An ideal tine position is the one where over the 360° reel rotation, the tines work at least over a rotational angle of 180° always in one direction. Thus, the tines are directed generally vertically to the ground. This means, that in the reels, which usually have six tine carriers, that the tines on four tine carriers project in a direction downwards. Accordingly, only the other two tine carriers are in the backwards rotating pivoting area. Heretofore, this ideal tine carrier control has not been achievable with any of the known constructions.

SUMMARY OF THE INVENTION

An object of the invention is to achieve the above predescribed tine control. According to the invention, the object is solved by an adjustment arrangement for the tine carriers of a reel for a cereal cutting device with reaping tines. The reel is rotatable around an axis of rotation and the tine carriers are off-set radially to the axis of rotation. The tine carriers are arranged parallel to the axis of rotation and are adjustable around an adjustment axis which extends parallel to the axis of rotation.

A control element includes a continuous loop first control curve which diverts from a circular path. The reel is rotatably arranged relative to the first control curve. The first control curve encloses the axis of rotation. The reel is arranged between the first control curve and an output element. The output element is connectable to the tine carrier.

A separate adjustment gear, which includes a driving element, is pivotably supportable around a pivoting axis on the reel. The adjustment gear is pivotably adjusted by the first control curve by a driving angle of rotation. Also, the output element is adjusted by an output angle of rotation. A ratio is provided where the output angle of rotation is larger than the driving angle of rotation.

Due to the ratio, the possibility arises that the tine carrier rotates more than 180° forwards and backwards and to select a curve form for the first control curve, which achieves because of the gear ratio the wanted position of the reaping tines. The engineer can freely select a layout for the control curve which is closest to the requested usage condition. Furthermore, it is advantageous, that the tine carrier tubes carry out a forward and backward movement, so that the danger of winding the stems is minimized. Furthermore, a relatively simple construction for the adjustment arrangement is achieved. The adjustment arrangement contains no complicated gear elements which ensures that during driving on the road, the tines are directed downwards. The condition or handling or operating the reel is simplified by such an adjustment arrangement. Advantageously the first control curve is formed roughly like an egg or oval.

According to a first embodiment, the adjustment gear of each tine carrier has a single arm control lever which acts as a driving element. The control lever can be pivotably supported on the reel around a pivoting axis. One end is eccentrically supported with respect to the pivoting axis on a first control curve. A pulling means, acts as transmission element from the driving element to the output element. The pulling means engages, eccentrically to the pivoting axis, one end on the single arm control lever and acts eccentrically with respect to the adjustment axis on the adjustment means, which acts as an output element. The output element is connectable to the tine carrier to pivotally adjust the tine carrier. The other end of the pulling means is connected to a spring element which pulls on the pulling means to keep it tensioned.

In a second embodiment of the adjustment arrangement, an adjustment gear of each tine carrier has a two arm control lever. The two arm control lever is pivotably supportable around a pivoting axis on the reel and is supported eccentrically with respect to the pivoting axis. One end of the control arm is on the first control curve which acts as a driving element. A pulling means acts as a transmission element from the driving element to the output element. The pulling means engages one end of the two-armed control lever. The pulling means acts upon an adjustment means eccentrically with respect to the adjustment axis onto which the adjustment means is connected to the tine carrier as an output element. The output element pivotally adjusts the tine carrier. The other end of the pulling means is connected to the other end of the control lever, which is distanced from the end cooperating with the first control curve.

In addition to the first embodiment, the pulling means comprises a first and a second pulling means. The adjustment means comprises a first and a second adjustment means. The first pulling means is attached to one end to the control lever and acts eccentrically with respect to the adjustment axis on the adjustment means which is connected to the tine carrier to pivotally adjust the tine carrier. The second pulling means is connected at one end to the second adjustment means. The other end of the second pulling means is connected to a spring element keeping the pulling means tensioned.

Additionally to the second embodiment, the pulling means comprises a first and a second pulling means. The adjustment means comprises a first and a second adjustment means. The first pulling means is fixed with one end to the control lever and acts eccentrically with respect to the adjustment axis onto the adjustment means which is connected to the tine carrier to pivotally adjust the tine carrier. The second pulling means is connected at one end to the second adjustment means. The other end of the second pulling means is connected to the second end of the two-armed control lever, which is distanced from the end cooperating with the first control curve.

In a preferred embodiment, the adjustment means of each tine carrier is formed as a pulling means gear. The pulling means gear comprises an adjustment disc acting as a driving element, pivotably supportable around a pivoting axis on the reel. The adjustment disc carries a control roller eccentrically positioned with respect to the pivoting axis. The roller interacts with the first control curve. A pulling means acts as a transmission element. A first control disc acts as an output element. The pulling means is guided around the adjustment disc and the first control disc. The adjustment disc has a larger diameter than the first control disc. Advantageously the first control disc is formed essentially larger in diameter than the first control disc, which is arranged on the tine carrier. The gear ratio between the two discs can be freely selected independently with an advantageous layout of the curve path of the first control curve. The pivoting range, with which the output elements are pivoted around the adjustment axis, is from 0° to 360° and advantageously from 180° to 210°.

In another embodiment, the pulling means may be chains, cogged belts, V-belts, flat belts or ropes. The adjustment means and the adjustment disc are correspondingly formed as chain gear, toothed belt pulleys, V-belts discs or flat belts discs. Preferably the spring element is formed as a tensioning spring, but also a compression spring is possible. The pulling means are then to be guided through the spring and to be fixed at one of the ends of the spring. The spring has then to be received in a spring bearing.

An advantageous support and guide of the control lever occurs when a support roller is supported on the control curve. In case only one control curve is provided, the support roller is held by the tensioning spring or the spring element in abutment to the first control curve.

In a further advantageous embodiment of the adjustment arrangement, the adjustment gear of each tine carrier is formed as a toothed gear. A first gear or a gear segment is pivotably supportable around a pivoting axis on the reel. A control roller is positioned on the first gear or gear segment. The roller interacts with the first control curve. The first gear or gear segment engages directly with a second gear mountable on the tine carrier or engages with the second gear with the interposition of an intermediate gear.

It is also possible to provide a second control curve which runs at a constant distance to the first control curve. In this case, the control lever or the support roller connected to the control lever, the adjustment disc, the first gear, or the gear segment is positively guided between the two control curves.

The reel of a combine-harvester corresponds in its width with the transversal width of a cutting device. Lately, cutting devices with widths of ten or more meters are common. Correspondingly the reel has to have the same width. The reel is rotatably supported on the bars on the side of the cutting device. This state of the art is commonly known and is not subject of the invention and therefore a representation thereof, is omitted.

The invention provides each rotational area of the reel with a different position of the reaping tine. For example, a control can be achieved such that the tines are directed vertically to the ground in the first path of rotation. Thus, the tines are able to dip into the harvesting goods without essentially diverting the goods. The tines may be directed to the cutting bar to aggressively pull the harvesting goods over the cutting bar. Also, the tines may project essentially vertical and pivot out of the following path so the tines easily pulled out the harvesting goods which are to be taken up by the machine.

In the following description, it is started from a reel for combine-harvester, however, such reels can be used in different harvesting machines, as a windrower or similar machines.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments will be described in detail by means of the drawings.

DETAILED DESCRIPTION OF THE PREFERRED EMBODIMENTS

Figure 1:
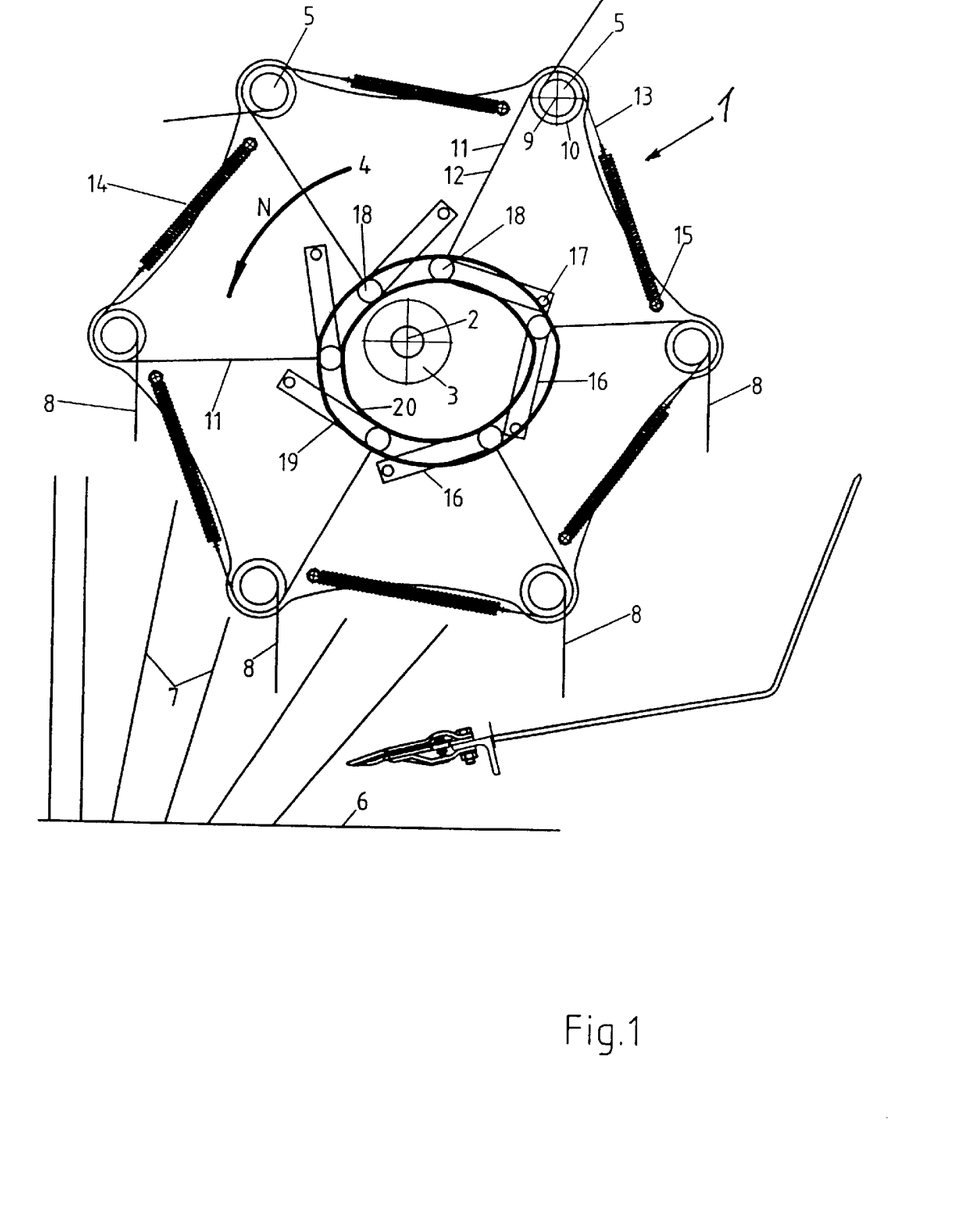
FIG. 1 is a schematic view of a first embodiment of an adjustment arrangement in reference to an end sided holding star of a reel.

In the embodiment of FIG. 1 the central tube of the reel 1 is designated by the reference numeral 3. The central tube 3 carries, depending on the reel width, a number of radial holding stars 4. The radial holding stars 4 can be rotationally driven together with the central tube 3 around the axis of rotation 2 in the arrow direction N. Tine carriers 5 are mounted circumferentially on the external circumference of the holding stars 4. The tine carrier 5 are tube-like and are rotationally adjustably supported around the adjusting axes 9. Reaping tines 8 are projectingly arranged on the tine carriers 5. The reaping tines 8 are distributedly arranged over the width projecting into the plate depth of the tine carrier 5. The reaping tines 8 are pivoted together with the tine carriers 5. A separate adjustment arrangement is provided to pivot each tine carrier 5.

The adjustment arrangement includes a first adjustment means in the form of control discs 10. Each tine carrier 5 carries a control disc 10. The control disc 10 pivots around the adjustment axis 9. A pulling means 11 is provided to pivot each control disc 10. The pulling means 11 includes a forwarding pulling means or first pulling means portion 12 and a return pulling means or second pulling means portion 13. The pulling means 11 is formed as a rope and frictionally abuts the external contour of the control disc 10. Thus, a pulling action on the first pulling means portion 12 pivots the tine carrier 5 supporting the reaping tines 8 around the adjustment axis 9 in a left pivoting sense. The second pulling means portion 13 is supported or fixed, via a spring element 14, such as a tensioning spring, on a mounting element 15 mounted on the holding star 4. The spring element 14 is tensioned as a pulling action occurs on the pulling portion 12.

The pulling action on the first pulling means portion 12 of the pulling means 11 is achieved by a control lever 16. The control lever 16 is formed as a single arm control lever. The control lever 16 is pivotably supported at one end around a pivot axis 17 on the holding star 4. A control roller 18 is mounted on the other end of the control lever 16. The pulling means 11 also engage the end of the control lever 16.

The control roller 18 of the control lever 16 is supported on an inner contour of a first control curve 19. It is kept in abutment with the first control curve by the pre-tensioned spring element 14. A second control curve 20 is arranged at a constant distance to the first control curve 19. Both control curves 19, 20 are off-set from the axis of rotation 2 of the reel 1. Thus, the control roller 18 is displaced and the control lever 16 is pivoted. As this occurs, pulling action of the first pulling means portion 12 of the pulling means 11 causes the tine carrier 5 to correspondingly pivot.

The two control curves 19, 20 have an egg form or an oval form. The form of the control curves 19, 20 can be designed according to the requirements in reference to the desired pivoting, to achieve the intended movement. The design described for one tine carrier 5 of the adjustment arrangement relates to all tine carriers 5. The control curves 19, 20 are kept stationary relative to the rotating reel 1. Accordingly, the curves 19, 20 do not rotate. Thus, the control rollers 18 come closer to or move away from the axis of rotation 2. The pivoting of the control lever corresponds to the extension of the path of the first control curve 19 to the axis of rotation 2 of the reel 1. Accordingly, a pivoting adjustment of the tine carrier 5 is carried out.

Figure 2:
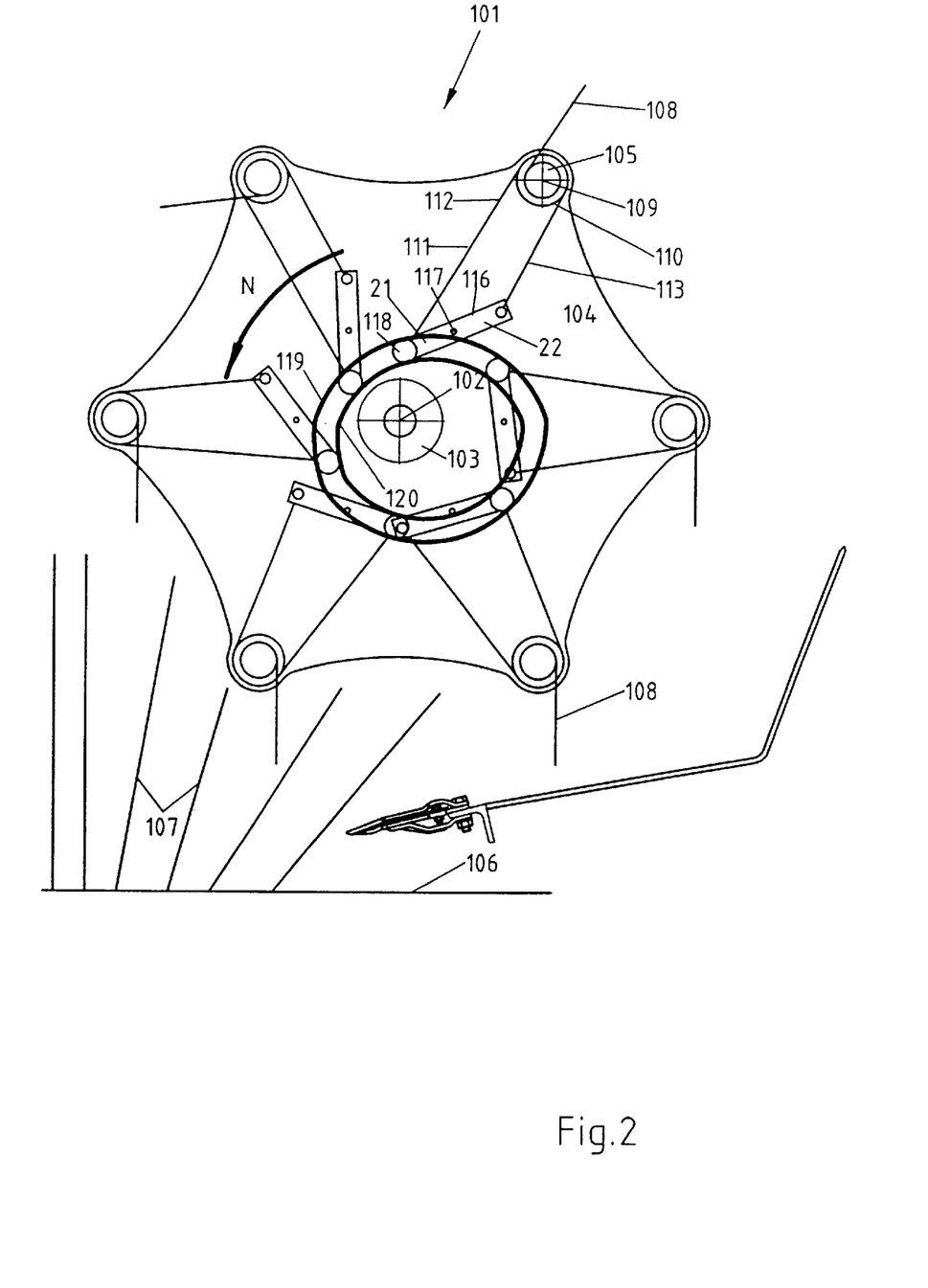
FIG. 2 is a schematic view of a second embodiment of an adjustment arrangement in reference to a front sided holding star of a reel.

FIG. 2 shows a second embodiment of an adjustment arrangement for a reel 101. The reel 101 corresponds to the one of FIG. 1. Insofar as the same elements are used in both figures, reference should be given to the description of FIG. 1. Reference numerals used in FIG. 2 differ by the value 100 from the ones in FIG. 1 with reference to like components used in the two embodiments.

Figure 3:
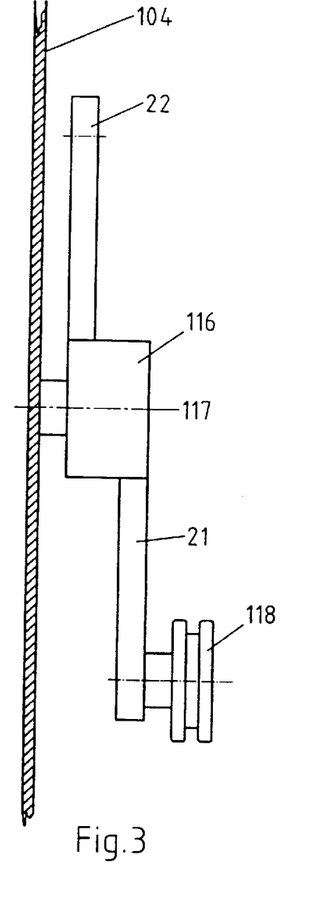
FIG. 3 is a partial cross-section view of a control lever with two arms for an embodiment of FIG. 2, with both arms off-set to each other.

Instead of a single arm control lever, a control lever 116 has two arms. The two armed control lever 116 is shown enlarged as a detail in FIG. 3. Two lever arms 21, 22 are essentially formed with the same length. The arms 21, 22 pivot around the pivoting axis 117.

A continuous pulling means 111 differs from the embodiment of FIG. 1. The first pulling means portion 112 is guided, starting from the connection to the first lever arm 21 via the control disc 110. The second pulling means portion 113, starting from the control disc 110 is connected to the end of the lever arm 22, distanced from the control roller 118. In this arrangement, a positive guidance is necessary for the control roller 118 between the two control curves, namely the first control curve 119 and the second control curve 120. The return has to take place via the second pulling means portion 113 by means of the control lever 116. In the embodiment according to FIG. 1 the return is carried out via the spring element 14.

In this embodiment, the control curves 119, 120 are stationarily and eccentrically supported with respect to the axis of rotation 102 on the reel carrier beam (not shown). The reel 101 is also supported on the reel carrier beam. The control curves 119, 120 can be pivoted clockwise or counter-clockwise by a small amount for limited adjustment of the angle of attack of the reaping tines 108. The first control curve 119 and the second control curve 120 are only represented as active curve contours. Curve carriers for the connection of the first and second control curves 119, 120, together, to the reel carrier beam are also not shown.

In both FIGS. 1 and 2 due to the control curves 19, 119 or 20, 120, the reaping tines 8, 108 are shown more or less vertically downwards in their operating range. The pivoting process starts from the upper right tine carrier where an extension points upwards to the right. The tine pivots in the driving direction and before dipping into the stems 7, 107, the tine is aligned downwards to the ground 6, 106. The downward position stays essentially the same until the diametrical position is achieved. The position is the same essentially over a rotational angle of the reel 1, 102 of 180°. The positions of the reaping tines 8, 108 are selected according to desired requirement by selecting corresponding curve corrections. The positions represented in combination with FIGS. 1 and 2 are, however, the most suitable positions. The tines enable a vertical dipping into the harvesting material so that a beating movement of the reaping tines 8, 108 is not produced. Further, during transport or storage on the transport wagon, the reaping times 8, 108 are directed downwards.

Figure 4:
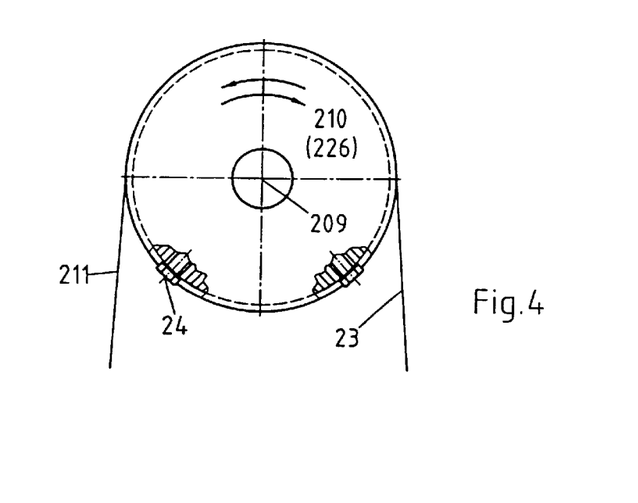
FIG. 4 is a plan view of an arrangement with two adjustment means formed as control discs and two pulling means.
Figure 5:
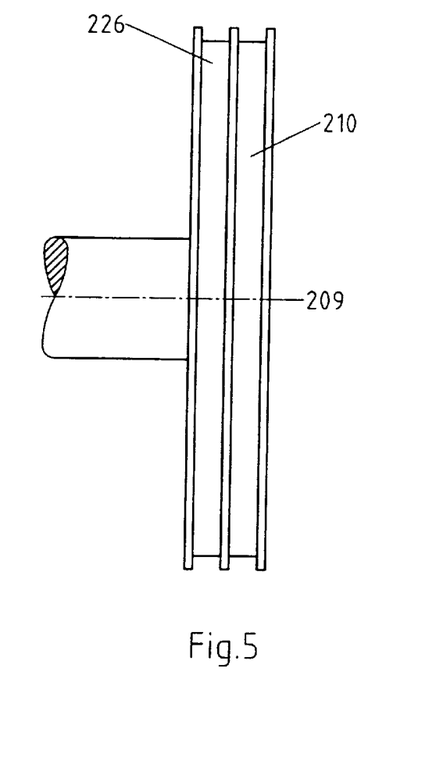
FIG. 5 is an enlarged side plan view of the arrangement of the two control discs of FIG. 4.

Alternatively, two pulling means can even be provided used in place of a continuous pulling means. Such an embodiment is shown simplified in the FIGS. 4 and 5. FIGS. 4 and 5 illustrate two control discs 210, 226 arranged next to one another on the adjustment axis 209. A first pulling means 211 leads to the control roller-sided end of a control lever. The first pulling means 211 is wound around the first control disc 210 over an extensive area and is fixed by means of a screw 24.

The second pulling means 23 is wound around the second control disc 226 over a part of its circumference. The second pulling means 23 is also fixed to the disc by means of a screw 24. The second pulling means 23 leads to a spring element or to an end of a control lever with two arms facing away from the control roller.

Figure 6:
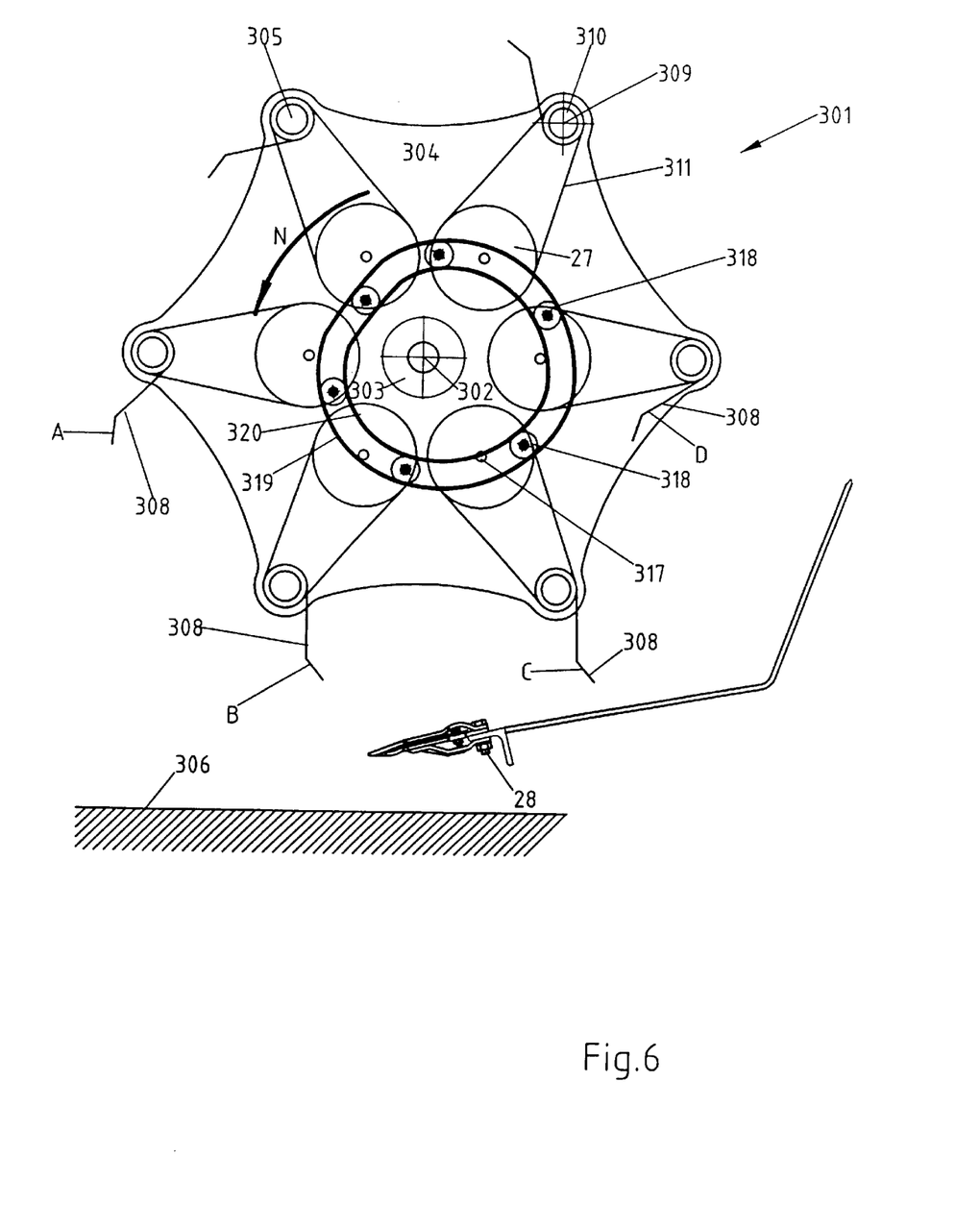
FIG. 6 is a schematic view of a third embodiment of an adjustment arrangement in reference to an end sided holding star of a reel.

A third embodiment is illustrated in FIG. 6. The reel central tube is designated by reference numeral 303. Holding star 304 is arranged along the reel width. The holding star 304 along with the central tube 303 is rotationally driven around the axis of rotation 302 in the arrow direction N. As in the other embodiments, tine carriers 305 are adjustably rotationally supported around the adjustment axes 309 on the external circumference of the holding star 304. Reaping tines 308 are respectively mounted on the tine carriers 305. The reaping tines can have an angled form. The tines 308 pivot together with the tine carriers 305.

Figure 7:
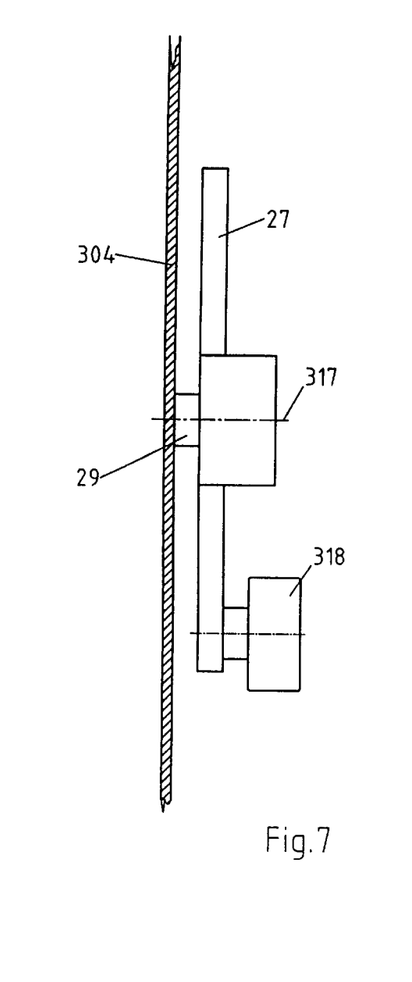
FIG. 7 is a partial cross-section view of a detail concerning the bearing of the adjustment discs belonging to the embodiment of FIG. 6 on the holding star.
Figure 9:
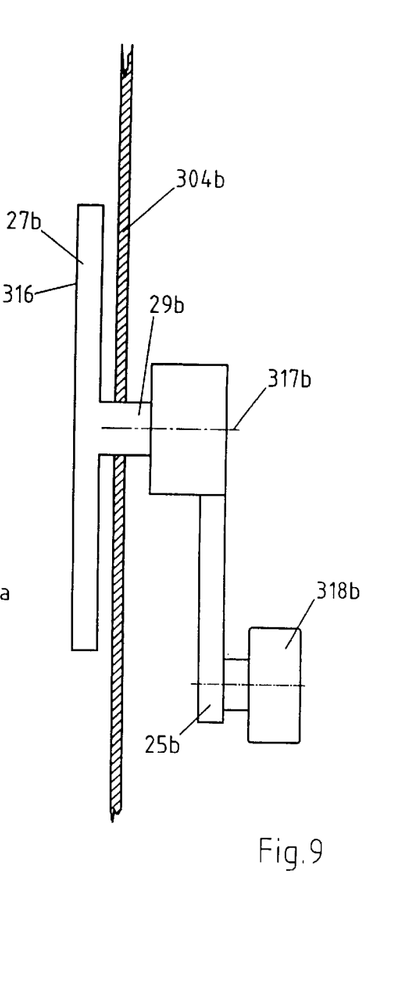
FIG. 9 is a view like FIG. 7 of a further embodiment of the bearing of the adjustment disc on the holding star.

An adjustment arrangement according to the invention is provided to pivot the tine carriers 305. The adjustment arrangement includes a first adjustment means in form of control discs 310. Alternatively, the control discs 310 can be formed as belt pulleys which are stationary connected to the tine carrier 305. Adjustment discs 27 are radially off-set to the inside, as seen in FIGS. 7 and 9. The adjustment discs 27 are belt pulleys supported on the holding star 304. In FIGS. 6 and 7, control rollers 318 are mounted axially projecting from the adjustment discs 27 distanced from the pivoting axis 317. A continuous pulling means 311, for example a toothed belt, is placed over the control disc 310 or the adjustment disc 27. The unit comprising the adjustment discs 27, the control discs 310 and the pulling means 311 rotates with the holding star 304 when the holding star is rotatably driven. The unit rotates relative to an arrangement, which comprises a first control curve 319 and a second control curve 320 running at a constant distance to the first control curve 319. These two control curves 319, 320 are stationarily mounted by holding arms. The holding arms rotatably support the reel 301.

The control rollers 318 of the individual adjustment discs 27 are guided between the two control curves 319, 320. The two control curves 319, 320 have a layout or contour so that a change of the distance to the axis of rotation 302 takes place at least over a partial area when rotating the reel 301. Thus, the adjustment discs 27 pivots around the pivoting axis 317 via the control roller guided between the two control curves 319, 320. This movement is transmitted to the adjustment disc 27 and the mating control disc 310 via the pulling means 311, which, in turn, leads to pivoting of the tine carrier 305 and the reaping tines 308 connected to the tine carrier 305. Advantageously a movement path is aspired in such a way, that in the area A the reaping tines 308 point vertically downwards to the ground 306. In the area B, the reaping tines 308 are adjusted so that they guide the stem towards the cutter bar 28. In the following rotational area C the tines are again essentially vertically directed and in area D the tines are in their most retracted position. The pivoting is then continued.

Figure 8:
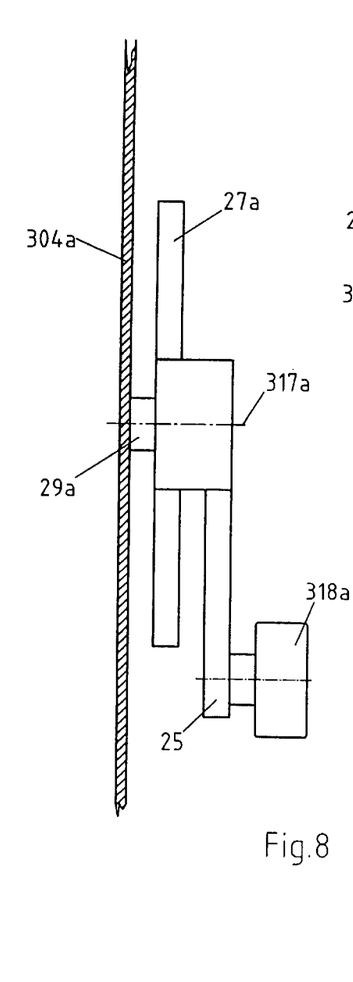
FIG. 8 is a view like FIG. 7 of an alternative embodiment of the adjustment disc and the control roller.

FIGS. 8 and 9 illustrate alternate arrangements of the control roller. In the embodiment according to FIG. 8, a separate adjustment disc 27a is provided. The disc 27a is supported by a bearing 29a on the holding star 304a. An arm 25 is attached to the bearing. The arm 25 supports the control roller 318a. The control roller 318a is eccentrically mounted with respect to the pivoting axis 317a. In the embodiment according to FIG. 9, the bearing of the adjustment disc 27b is directly carried in the holding star 304b. Accordingly, the adjustment disc 27b lies parallel to the holding star 304b. The arm 25b, connected to the bearing 317b, and the control roller 318b eccentrically mounted on the arm 25b lies to the right of the holding star 304b.

Figure 10:
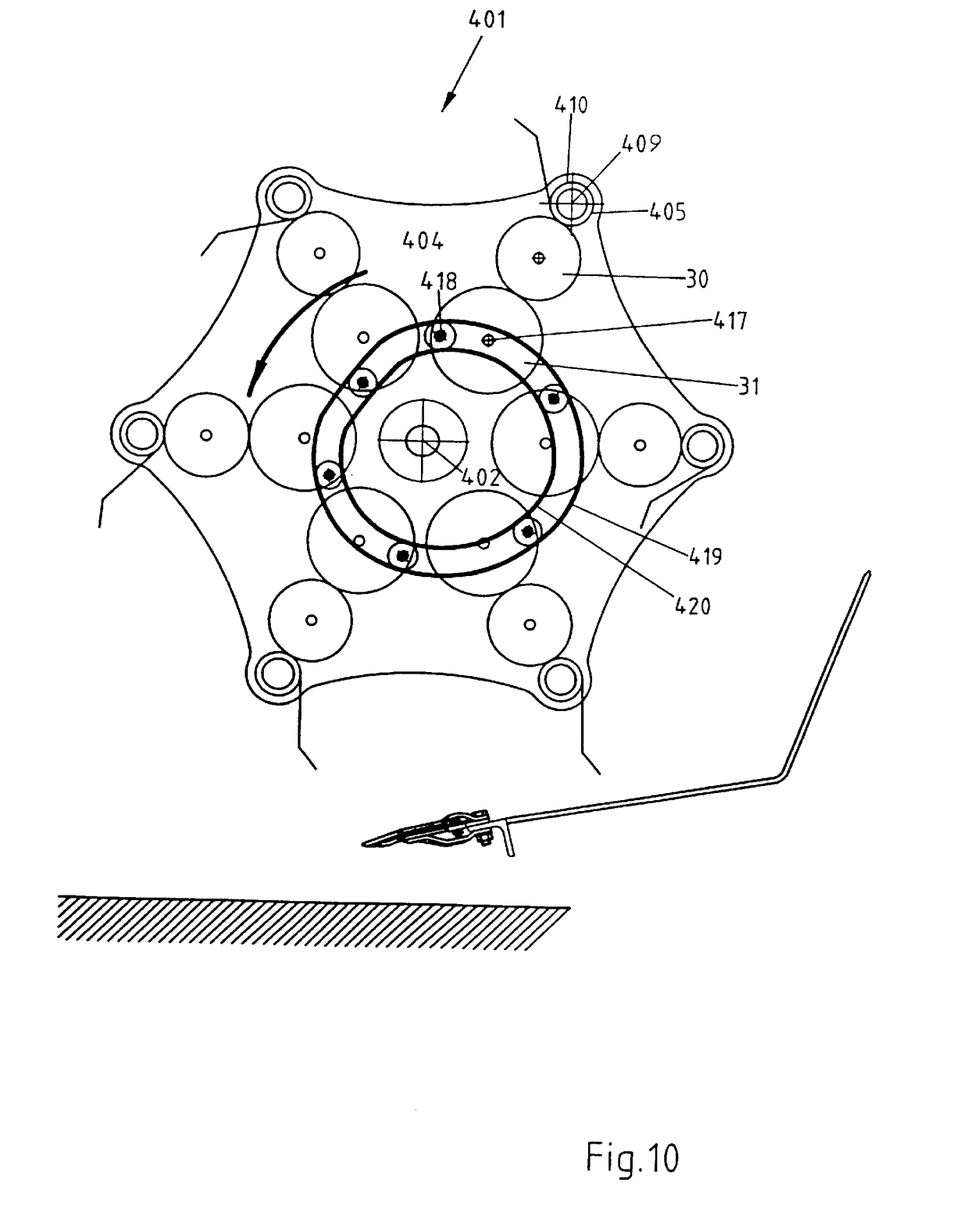
FIG. 10 is a schematic view of a fourth embodiment of an adjustment arrangement with a gear set as an adjustment mechanism.

FIG. 10 illustrates a fourth embodiment of the invention. A first adjustment means, in the form of a second gear 410, which acts as an output member is coupled with the tine carrier 405. The second gear 410 is rotatably connected, via a toothed intermediate gear 30, to a first gear 31. A control roller 418 is arranged on the first gear 31. The control roller 418 is guided between a first control curve 419 and a second control curve 420. The control roller 418 is pivotably supported on the holding star 404 of the reel 401 around the pivoting axis 417. The diameter of the gears, starting from the first gear to the gear 410, decreases with the interposition of the toothed intermediate gear 30. Transmission to the faster gear takes place. Thus, the rotational angle that the first gear 31 carries out around the pivoting axis 417 is smaller than the rotational angle than the second gear 410 carries out around the pivoting axis 409. This is determined by the gear ratio, the design of the two control curves 419, 420 and their position with respect to the axis of rotation 402 of the holding star 404.

Figure 11:
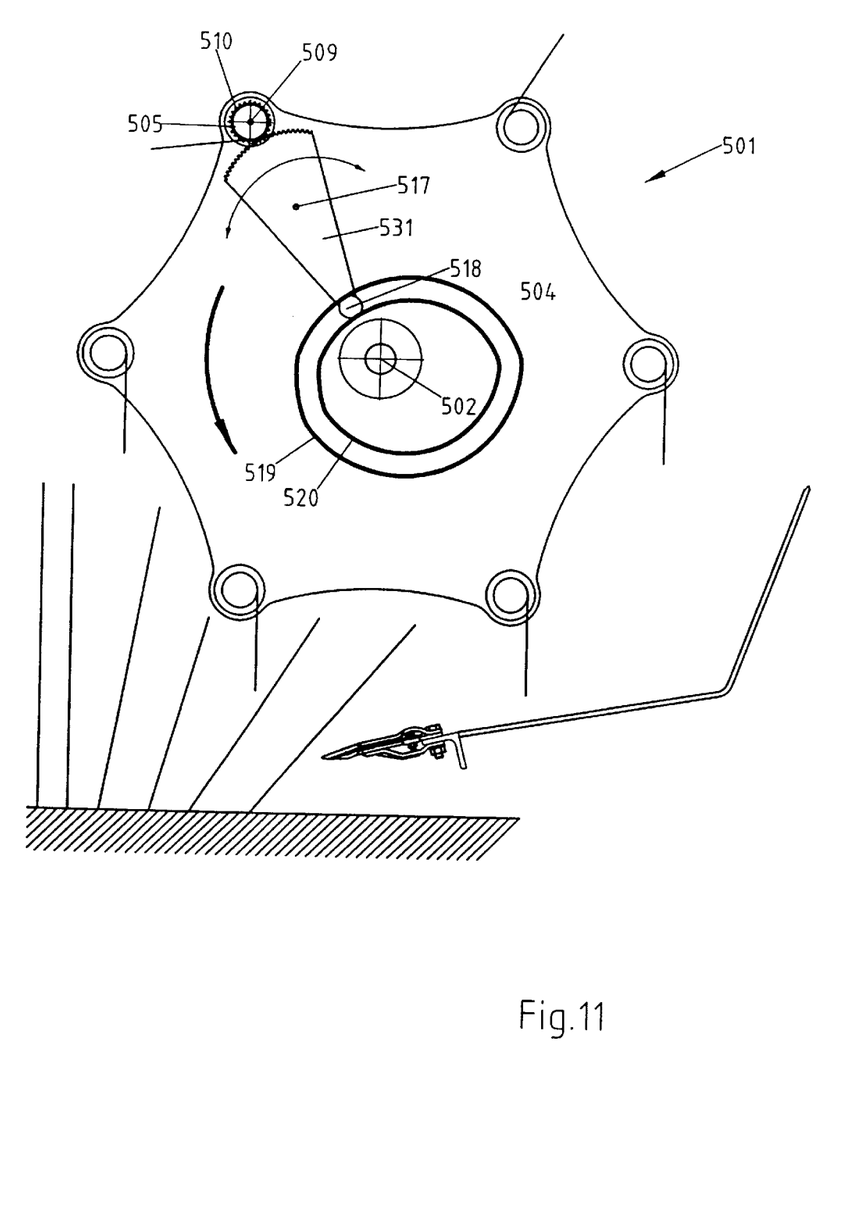
FIG. 11 is a schematic view of a fifth embodiment with an adjustment mechanism with a gear segment.

FIG. 11 illustrates a fifth embodiment which includes a gear segment 531 instead of a complete first gear. The gear segment 531 carries the control roller 518 at one end. The control roller 518 is guided between the two control curves 519, 520. The gear segment 531 serves as a driving element and pivots around the pivot axis 517. The gear segment 531 meshes directly with the output element formed as a second gear 510. The second gear 510 is connected to the tine carrier 505. The gear segment 531 is pivotably supported on the holding star 504 around the pivoting axis 517.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjustment arrangement for reel tine carriers for a cereal cutting device comprising:

a reel rotatable around an axis of rotation;

tine carriers carrying reaping tines coupled with said reel are off-set radially to the axis of rotation and are arranged parallel to the axis of rotation, said tine carriers being adjustable around an adjustment axis which extends parallel to the axis of rotation;

a control element including a continuous loop first control curve diverting from a circular path, said reel being rotatably arranged with respect to said first control curve, and said first control curve encloses the reel axis of rotation and said first control curve arranged between the axis of rotation and an output element, said output element connectable to the tine carrier; and a separate adjustment gear coupled with said tine carrier, said adjustment gear rotating said tine carrier about said adjustment axis adjusting the position of said tine as said tine carrier rotates about the axis of rotation;

a driving element pivotably supported around a pivoting axis on the reel, said driving element being pivotably adjusted by the first control curve by a driving angle of rotation, and said output element being adjusted by an output angle of rotation, wherein a ratio is provided so that the output angle of rotation is larger than the driving angle of rotation.

2. Adjustment arrangement according to claim 1, wherein the continuous loop first control curve has more or less an egg shape or is oval shaped.

3. Adjustment arrangement according to claim 1, wherein the adjustment gear of each tine carrier has a single arm control lever pivotably supported on the reel, one end of said control lever being eccentrically supported with respect to the pivoting axis on the first control curve; a pulling means between the driving element and the adjustment gear for pivotal adjustment of the tine carrier, one end of the pulling means coupled with the control lever and another end connected to a spring element holding pulling tension on the pulling means.

4. Adjustable arrangement according to claim 1, wherein the adjustment gear of each tine carrier comprises a two-armed control lever pivotably supported around a pivoting axis on the reel, said control lever eccentrically supported with respect to the pivot axis with one end on the first control curve, a pulling means from the driving element to the adjustment gear, said pulling means engages one end on the two-armed control lever and acts eccentrically to the adjustment axis onto the adjustment gear connectable to the tine carrier for pivoting adjustment of the tine carrier, and a second end of said pulling means connected to an end of the control lever which is distanced from the end interacting with the first control curve.

5. Adjustment arrangement according to claim 3, wherein the pulling means comprises a first and a second pulling means and the adjustment gear comprises a first and a second adjustment gear, said first pulling means is fixed with one end to the control lever and acts eccentrically to the adjustment axis onto the adjustment gear, said adjustment gear connectable to the tine carrier for pivoting adjustment of the tine carrier and said second pulling means being fixed with one end to the second adjustment gear and its other end connected to the spring element.

6. Adjustment arrangement according to claim 4, wherein the pulling means comprises a first and a second pulling means and the adjustment gear comprises a first and a second adjustment gears, said first pulling means fixed with one end to the control lever and acts eccentrically to the adjustment axis onto the adjustment means connectable to the tine carrier for the pivoting adjustment of the tine carrier and said second pulling means connected with one end to the second adjustment means and a second end connected with the end of the two-armed control lever, which is distanced from the end interacting with the first control curve.

7. Adjustment arrangement according to claim 1, wherein the adjustment gear of each tine carrier being a pulling means gear and comprises an adjustment disc pivotably supportable around a pivoting axis on the reel, said disc carries a control roller eccentrically to the pivoting axis, said control roller interacts with the first control curve, and a pulling means and a first control disc, wherein the pulling means is guided around the adjustment disc and the first control disc.

8. Adjustment arrangement according to claim 7, wherein the adjustment disc has a larger diameter than the first control disc.

9. Adjustment arrangement according to claim 1, wherein the pivoting range, at which the output elements are adjustable around the adjustment axis, extends from 0° to 360°, especially from 180° to 210°.

10. Adjustment arrangement according to claim 3, wherein the pulling means being chains, cogged belts, V-belts, flat belts or ropes and the adjustment gear and the adjustment disc being correspondingly formed as chain gears, toothed belt pulleys, V-belt discs or flat belt discs.

11. Adjustment arrangement according to claim 3, wherein the spring element being a tensioning spring or a compression spring.

12. Adjustment arrangement according to claim 3, wherein the control lever is supported by a control roller on the first control curve.

13. Adjustment arrangement according to claim 1, wherein the adjustment gear of each tine carrier being a toothed gear set, a first gear pivotably supported around a pivoting axis on the reel or as a gear segment, a control roller is carried eccentrically to the pivoting axis on said gear or gear segment, said control roller interacts with the first control curve, and said gear or gear segment engages directly with a second gear mountable on the tine carrier or engages with a second gear with an intermediate gear.

14. Adjustment arrangement according to claim 7, wherein a second control curve is provided which extends at a constant distance to the first control curve and which guides positively the control roller.

* * * * *

UNITED STATES PATENT AND TRADEMARK OFFICE
CERTIFICATE OF CORRECTION

PATENT NO. : 6,698,175 B
DATED : March 2, 2004
INVENTOR(S) : Schumacher et al.

It is certified that error appears in the above-identified patent and that said Letters Patent is hereby corrected as shown below:

Title page,
Item [75], Inventors, "Fredrich-Wilhelm Schumacher" should read -- Friedrich-Wilhelm Schumacher --

Column 1,
Line 13, after "for", delete "a"

Column 6,
Line 13, "carrier" should be -- carriers --

Column 8,
Line 19, "stationary" should be -- stationarily --
Line 41, "pivots" should be -- pivot --

Column 10,
Line 36, "gears" should be -- gear --.

Signed and Sealed this

Twentieth Day of July, 2004

JON W. DUDAS
*Acting Director of the United States Patent and Trademark Office*